(12) United States Patent
Ludwig

(10) Patent No.: US 6,797,124 B2
(45) Date of Patent: Sep. 28, 2004

(54) SOLAR DISTILLATION UNIT

(76) Inventor: David M. Ludwig, 31 W. Ventura St., Tucson, AZ (US) 85705

(*) Notice: Subject to any disclaimer, the term of this patent is extended or adjusted under 35 U.S.C. 154(b) by 0 days.

(21) Appl. No.: 10/283,763

(22) Filed: Oct. 30, 2002

(65) Prior Publication Data

US 2003/0057084 A1 Mar. 27, 2003

Related U.S. Application Data

(63) Continuation-in-part of application No. 09/589,138, filed on Jun. 7, 2000, now abandoned.
(60) Provisional application No. 60/174,341, filed on Jan. 4, 2000.

(51) Int. Cl.[7] .............................. B01D 3/02; C02F 1/14
(52) U.S. Cl. ............... 202/234; 159/903; 159/DIG. 15; 202/200; 202/267.1; 203/10; 203/86; 203/DIG. 1
(58) Field of Search ............................ 1203/10, 2, 86, 1203/4, DIG. 17, DIG. 1, 100; 202/234, 267.1, 200, 242; 159/903, DIG. 15; 210/295

(56) References Cited

U.S. PATENT DOCUMENTS

| | | | |
|---|---|---|---|
| 3,501,381 A | 3/1970 | Delano | 22/83 |
| 3,775,257 A | 11/1973 | Lovrich | 202/234 |
| 3,968,786 A | 7/1976 | Spielberg | 126/270 |
| 4,037,583 A | 7/1977 | Bakun et al. | 126/271 |
| 4,219,387 A * | 8/1980 | Gruntman | 202/182 |
| 4,297,813 A | 11/1981 | Farrell et al. | 52/2 |
| 4,383,891 A | 5/1983 | Clavier | 202/234 |
| 4,959,127 A * | 9/1990 | Michna | 202/177 |
| 5,133,837 A * | 7/1992 | Elmore et al. | 202/173 |
| 5,368,698 A * | 11/1994 | Field et al. | 202/180 |
| 5,628,879 A | 5/1997 | Woodruff | 202/234 |
| 6,274,004 B1 | 8/2001 | Andersen | 202/234 |
| 6,342,127 B1 | 1/2002 | Possidento | 202/234 |

FOREIGN PATENT DOCUMENTS

| | | |
|---|---|---|
| DE | 2604978 | 3/1977 |
| DE | 3618279 | 5/1986 |
| DE | 3829725 | 6/1989 |
| GB | 2345002 | 6/2000 |

OTHER PUBLICATIONS

Kulunk et al., Sixth Miami International Symposium on Heat and Mass Transfer, Dec. 10–12, 1990, Coral Gables, Florida.
Cress et al., "Solar Still for Purifying Water used for Growth Chamber and Mite Rearing," Trans. Kans. Acad. Sci (1978).
Okeke et al., "Effects of Coal and Charcoal on Solar Still Performance," pp. 1071–1073, 1990.

* cited by examiner

*Primary Examiner*—Virginia Manoharan
(74) *Attorney, Agent, or Firm*—Quarles & Brady Streich Lang LLP; Antonio R. Durando

(57) ABSTRACT

A solar distilling apparatus employs anthracite coal as a heat-absorbing medium. Greenhouse roof elements rest over a gutter that is isolated from the water-holding container to prevent deposit formation and algae growth from reaching the gutter. Bacterial growth is inhibited by ventilation and the use of titanium-laden magnetite mixed with the anthracite particles. The gutter is also isolated from the exterior of the unit, which prevents contamination from outside sources. The exterior side of the roof elements resting on the gutter are fitted with a metal skirt that provides a heat sink preventing the re-evaporation of condensation flowing toward the gutter.

14 Claims, 5 Drawing Sheets

SOLAR DISTILLATION UNIT

RELATED APPLICATIONS

This application is a continuation-in-part application of U.S. Ser. No. 09/589,138, filed Jun. 7, 2000, now abandoned, which was based on U.S. Provisional Ser. No. 60/174,341, filed Jan. 4, 2000.

BACKGROUND OF THE INVENTION

1. Field of the Invention

The present invention relates to an apparatus for distilling water using solar energy and method for use thereof, particularly to provide hot or cold water for irrigation and drinking.

2. Description of the Related Art

The need for treating water to make it safe and satisfying for human needs, particularly for drinking, is easily appreciated. It is common experience that tap water in many areas of the world where water is not plentiful may contain high concentrations of contaminants that make the water taste bad as well as, potentially, pose health risks. It is also increasingly appreciated that people should drink a substantial amount of pure water, and this is one of the reasons for the popularity of bottled water, which people enjoy but which has the obvious disadvantage that it is expensive. Bottled water has also been found to be inconsistent in quality.

The interest in employing solar energy where practical as an alternative energy source is also well known. Distilling water, i.e., evaporating the water and collecting the water as condensate, is a process that is particularly well suited to being driven by solar energy.

There are many known apparatus for distilling water using solar energy. These frequently include a black-body absorber, to absorb a wide frequency spectrum of the sun's electromagnetic radiation to provide for maximum heating, a glass or plastic covered enclosure to provide for a "greenhouse" effect to trap the heat, and, often, a reflector or concentrator to concentrate the sun's rays on the water to be distilled, such as a parabolic mirror or fresnel lens.

There are some important problems with these known apparatus. A reflector or concentrator adds significant cost and complexity, and becomes less useful over time as condensation forms on the reflector or concentrator, inevitably bringing with it some contamination from the atmosphere into the apparatus. This contamination decreases the reflectivity or transmissivity of the reflector or concentrator.

The efficiency of the black-body used for the absorber is also diminished over time as sediment and other contaminants in the water are left behind during distillation and collect thereon. The glass or plastic cover itself collects dust and contamination which blocks some of the energy from reaching the water to be distilled. Moreover, such apparatus are often provided so that the cover is relatively airtight to shield the interior of the apparatus from contaminants in the atmosphere. However, the resulting lack of ventilation may hasten the growth of bacteria, fungus and algae in the apparatus, which detracts from the capability of the apparatus to heat the water and to provide the water in a condition that is safe and pleasant to drink.

Further, volatile components in the water are not permitted to escape the apparatus when it is relatively airtight. Moreover, the materials of which the apparatus is formed may introduce contaminants themselves, such as by outgassing, or by corrosion or degradation as a result of contact with the water or exposure to radiation from the sun and elements and charged particles in the atmosphere.

Because of these shortcomings, the requirements for an optimally effective water distilling apparatus have to be stringent and are hard to achieve. Accordingly, there is a need for an apparatus for distilling water using solar energy and for a method of use thereof that provide increased energy efficiency, that can be maintained and used to a greater degree over time, that provide for simplicity of construction and a consequent reduction in manufacturing costs, and that provide optimally healthful drinking water.

BRIEF SUMMARY OF THE INVENTION

The apparatus of the present invention for distilling water using solar energy and the method for use thereof solve the aforementioned problems and meet the aforementioned needs by providing a water-holding container that includes a black-body absorber of fragmented anthracite coal over which water to be distilled is controllably flowed and allowed to settle, and a greenhouse covering disposed above the black-body absorber which preferably includes at least one pitched roof element formed of glass with, most preferably, a pitch of at least 30 degrees. A gutter is disposed at the base of the pitched roof element to collect and carry water that has condensed on the pitched roof element and which flows down the pitched roof element under the force of gravity. Preferably, all of the components of the apparatus are selected and connected together to prevent leeching or out-gassing of contaminants, or corrosion by the water, by restricting the materials in the apparatus that come into contact with the water to glass, noble metal, coal, silicone and titanium-laden magnetite.

Preferably, ventilation means are provided to dry the interior volume of the apparatus during times when the sun is not actively evaporating water, so as to discourage the formation of algae and other organisms. Bacterial growth is preferably further inhibited by the use of titanium-laden magnetite mixed with the anthracite particles. According to a particular aspect of the invention, the gutter over which the roof elements rest is isolated from the water-holding container in order to prevent deposit formation and algae growth from reaching the gutter over time. The gutter is also isolated from the exterior of the unit, which prevents contamination from outside sources. According to another aspect of the invention, the exterior side of the roof elements resting on the gutter are fitted with a metal skirt that provides a heat sink that prevents the re-evaporation of condensation flowing toward the gutter.

A method is also provided for maintaining and producing optimum health that results from the recognition that water treated according to the invention remains more healthful than ordinary water for a period of 7 days after it has been evaporated. The method comprises ingesting solar evaporated water daily so as to ensure that the water is not "older" than this period, in amounts that are substantial by comparison to the total water ingested exclusive of the water present in food and beverages that have also been ingested.

Therefore, it is a principal object of the present invention to provide a novel and improved apparatus for distilling water using solar energy and method for use thereof.

It is another object of the present invention to provide an apparatus for distilling water using solar energy and a method for use thereof that increase energy and distillation efficiency.

It is yet another object of the present invention to provide an apparatus for distilling water using solar energy and a method for use thereof that maintain energy and distillation efficiency over the life of the apparatus.

It is still another object of the present invention to provide an apparatus for distilling water using solar energy and a method for use thereof that increase the longevity of the distilling apparatus.

It is a further object of the present invention to provide an apparatus for distilling water using solar energy and a method for use thereof that utilize simpler components and, therefore, yield a decrease in manufacturing costs.

It is still a further object of the present invention to provide an apparatus for distilling water using solar energy and a method for use thereof that discourage the growth of organisms in the apparatus.

It is yet a further object of the present invention to provide an apparatus for distilling water using solar energy and a method for use thereof that permit storage of the water for future use while discouraging the growth of organisms in the water.

It is also an object of the present invention to provide an apparatus for distilling water using solar energy and a method for use thereof that prevent re-evaporation of condensed water, especially at night time, as the water droplets reach the gutter in the proximity of the water-holding container.

It is still another object of the present invention to provide an apparatus for distilling water using solar energy and a method for use thereof that promote and maintain good health.

The foregoing and other objects, features and advantages of the present invention will be more readily understood upon consideration of the following detailed description of the invention, taken in conjunction with the following drawings.

DESCRIPTION OF THE PREFERRED EMBODIMENTS OF THE INVENTION

The heart of this invention is in the novel combination of features and materials that provide efficient operation and improved durability of performance even under harsh climatic conditions. All materials are selected to prevent corrosion, deterioration, formation of permanent deposits on the heat absorbing medium, and propagation of biological contamination into the water produced by the solar distillation unit. In addition, the particular geometry of the unit is selected to improve evaporation efficiency, maintenance-free cleanliness of the apparatus, and long-lasting yield of high quality water with minimal variation due to ambient conditions.

Figure 1:
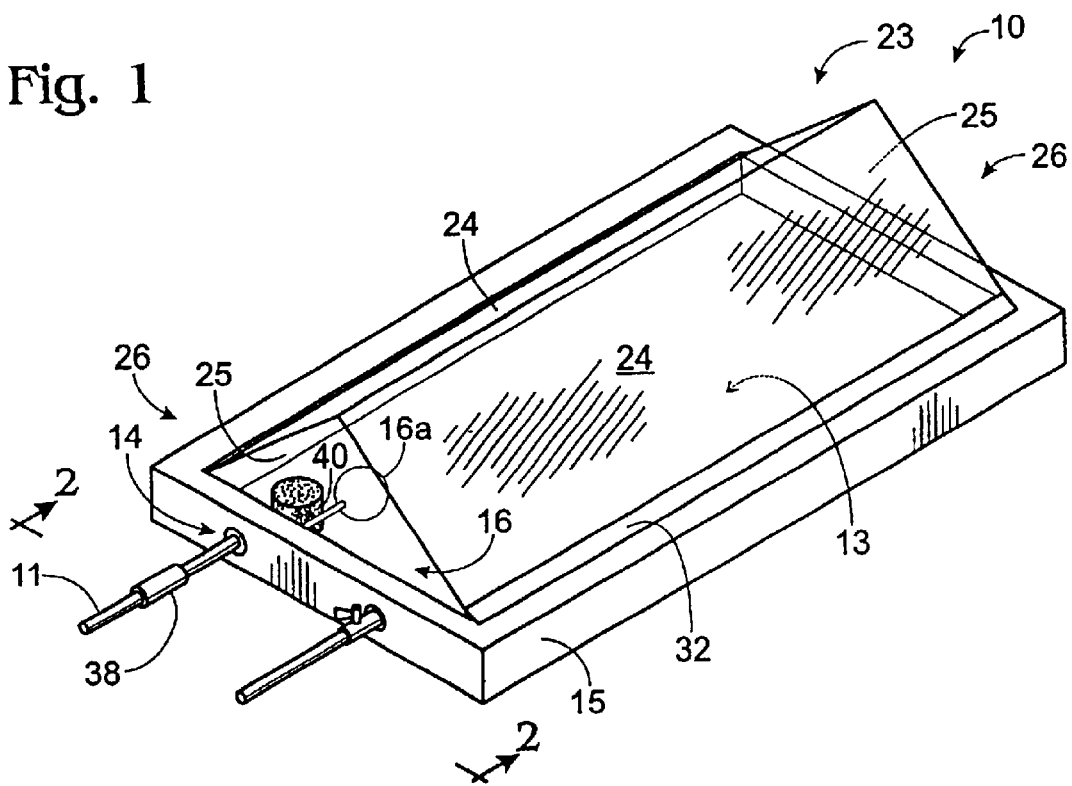
FIG. 1 is a pictorial view of an apparatus for distilling water using solar energy according to the present invention.
Figure 2:
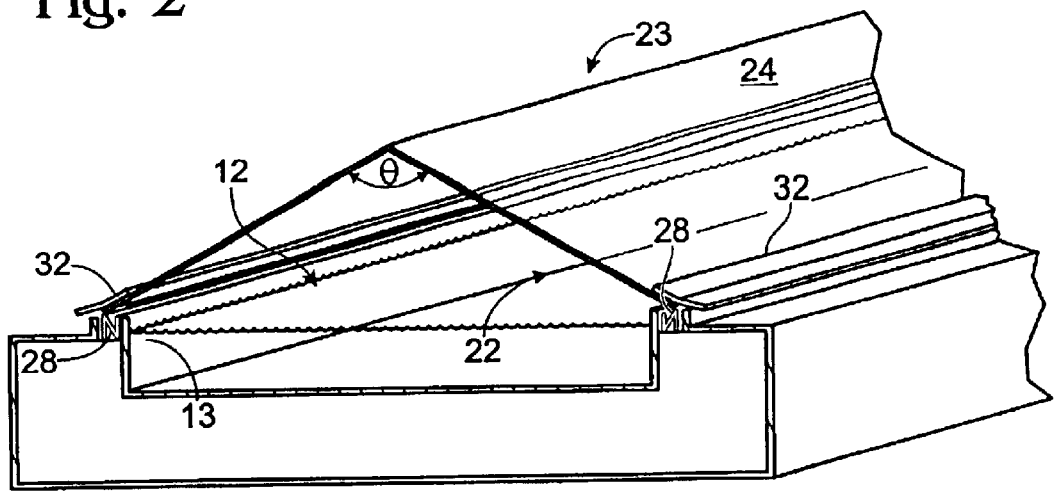
FIG. 2 is a pictorial view of a vent according to the present invention for use in the apparatus of FIG. 1 taken along the line 2—2.

Referring to FIGS. 1 and 2, a preferred apparatus 10 for distilling water using solar energy according to the present invention is shown. The apparatus 10 includes a water-holding stainless steel container defining a volume 12 for receiving water to be distilled. The container is preferably in the form of a tray 13 and the water is provided through an inlet connection 14 communicating with a city water line 11 or the like, and metered by a float valve 16 and a float 16a which admit water into the tray whenever the level of the water drops below a predetermined amount. The float valve 16 and the inlet connection 14, which are typically formed of a metal that differs from the metal used for the tray 13, are preferably electrically isolated from the tray to prevent galvanic corrosion. This is accomplished with, for example, plastic or fiber washers. The tray is preferably set into a foam-insulated shell 15 that is preferably protected by a galvanized sheet steel exterior. The insulation maintains heat in the tray 13 so that it may continue to transfer heat to the water for evaporating the water after the sun has set.

Figure 3:
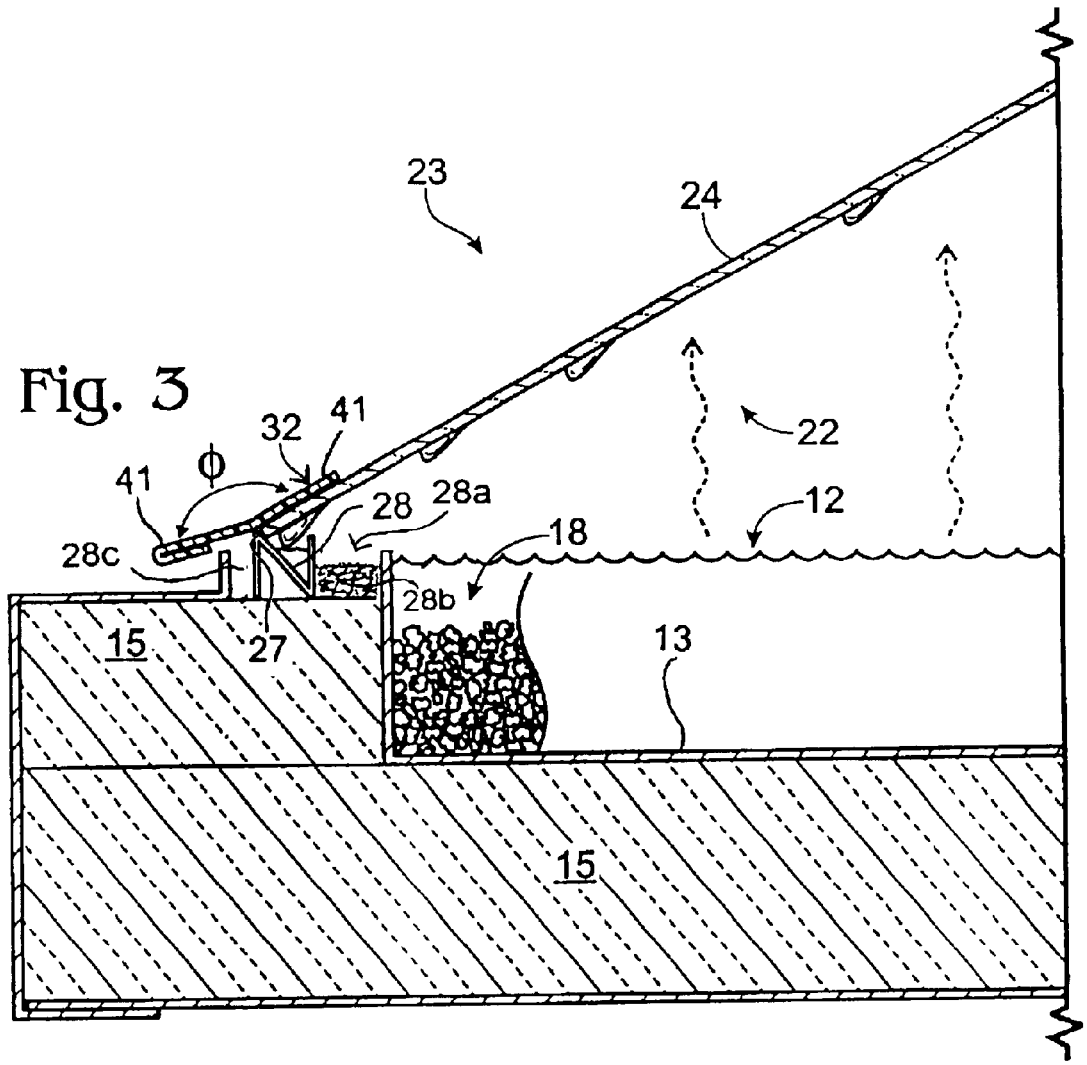
FIG. 3 is a partial section of the apparatus of FIG. 1, as shown in FIG. 2.

Referring to FIG. 3, the tray contains a black, solar energy absorbing material 18 as well as incoming water. It has been determined that the most effective material for this purpose in a solar distiller is coal (including charcoal), preferably anthracite coal. The coal is provided in fragmented form, preferably in granules that are not larger than about one-half the size of a pea (that is, smaller than about 3 mm in nominal diameter). One of the advantages the coal has been determined to provide in this application is an additional amount of filtration and extraction of dissolved gases. Another advantage is that it has a surface that naturally sloughs off sediments and deposits left by the evaporating water. These sediments and deposits adhere to the typical black-body absorber employed in the prior art, or at least remain on its surfaces, increasing its reflectivity and thereby ruining its ability to absorb solar energy. On the other hand, the same sediments and deposits have been observed to fall off the surfaces of coal granules, into the cracks and openings therebetween, which has further been observed to greatly increase the service life and efficiency of the apparatus. To further promote these characteristics, it has been found that periodic stirring of the fragments is effective to increase settling of the sediments and deposits.

Figure 4:
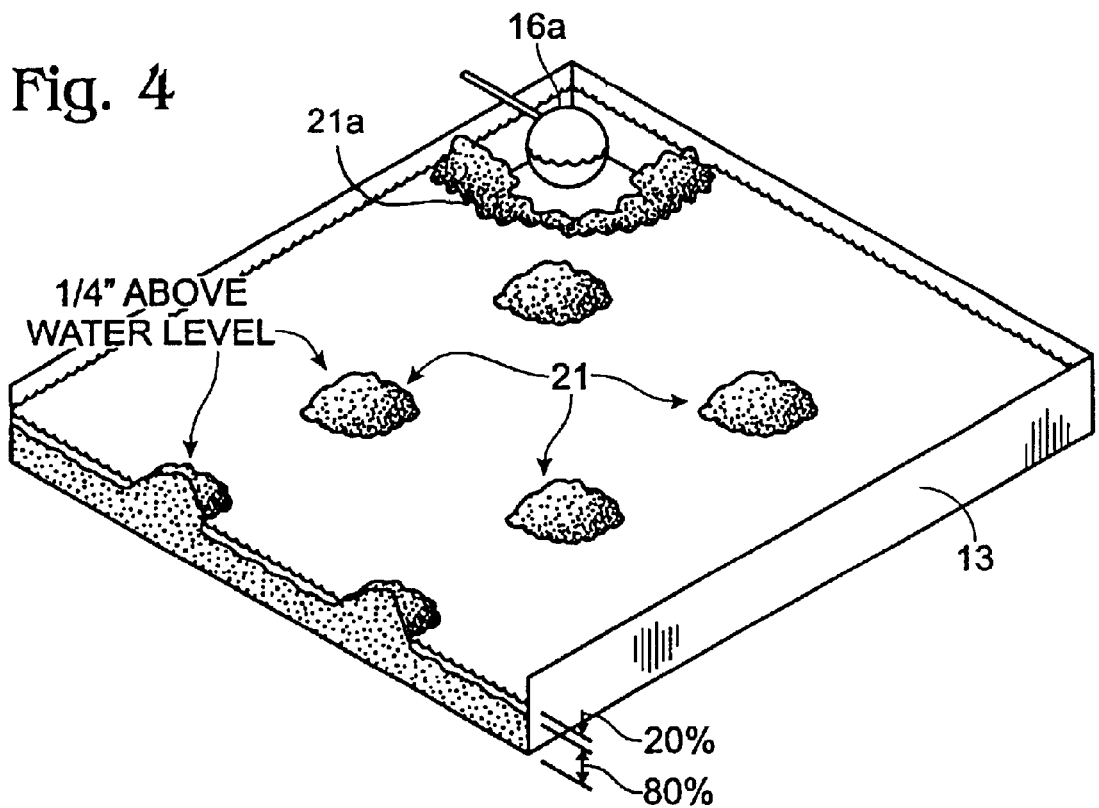
FIG. 4 is a pictorial view of a "coal pouring" method and structure according to the present invention.

Turning to FIG. 4, the fragments or granules are preferably provided to a depth, in relation to the depth of water in the tray 13, that is approximately 80% of the depth of the water. In addition, some hillocks 21 are preferably provided that extend about ¼" above the water on about 6"–12" centers, and the coal is built up to form an emerging berm 21a around the float 16a of the float valve 16. This "coal pouring" configuration is believed to provide additional filtration and an optimum yield of distilled water.

Returning to FIGS. 1–3, it is recognized that a black-body absorber is also an efficient radiator of the energy that is absorbed, and this is used to advantage by providing a greenhouse covering 22 disposed above the water-holding container that blocks infrared radiation (which is felt as heat) but admits radiation of higher frequencies. Glass is the preferred material even though plastic can be used as a greenhouse covering. More particularly, for ease of construction, low cost and simplicity, the preferred greenhouse covering is a tent-like structure 23 formed of two side panes of glass 24, though three or more panes arranged in a "zig-zag" configuration would also be a reasonably inexpensive and simple alternative. The structure 23 is placed over the tray 13 with end panels to form a substantially enclosed volume which retains the heat radiated by the black-body absorber 18. This volume receives water evaporating from the tray 13, the evaporated water condensing on interior surfaces of the covering 22 as distilled water.

The structure 23 provides for a minimum slope or pitch. It has been determined that the pitch, measured with respect to the horizon, of the side panes 24 should be at least about 30 degrees to promote the discharge of condensation on the interior and prevent the accumulation of debris and contamination on the exterior surfaces thereof. Such a minimum pitch also provides the advantage that the external atmosphere does not reduce the transmissivity of solar energy into the heat absorbing volume appreciably over time. An included angle θ (FIG. 2) of no more than about 120 degrees between two panes of glass 24 provides the desired pitch when the apparatus is fixed properly with respect to the horizontal.

The panes of glass are preferably joined to one another with a silicone adhesive material. Two substantially triangular panes 25 of glass are also joined to the structure at each end 26 of the solar unit 10. These may be disposed vertically. Referring particularly to FIGS. 2 and 3, gutters 28 are provided to collect condensate from the structure 23. The gutters are formed of stainless steel, most simply by bending sheet material. The gutters 28 are disposed so that they abut an edge of the structure 23, just above the tray 13, as best seen in FIG. 3. Preferably a gutter is provided adjacent each pane of glass 24 and 25 and the gutters are joined at their ends to form a continuous trough encircling the interior of the structure 23. Water condensing on the interior surfaces of the structure 23 will run down along these surfaces into the gutters 28 for collection. The gutters are slightly sloped to carry the water to one of the ends 26 of the structure, where it can be picked up and carried to a destination for storage or immediate use. Preferably, the gutters 28 are spaced from the tray 13 by an inner channel 28$a$ which provides a gap to break the heat conductive path that would otherwise be present between the glass panes 24, 25 and the tray 13. In cooperation with the insulation 15, the inner channels 28$a$ enhance the capability of the apparatus 10 to continue to transfer heat from the tray to the water for evaporating the water after the sun has set.

Figure 5:
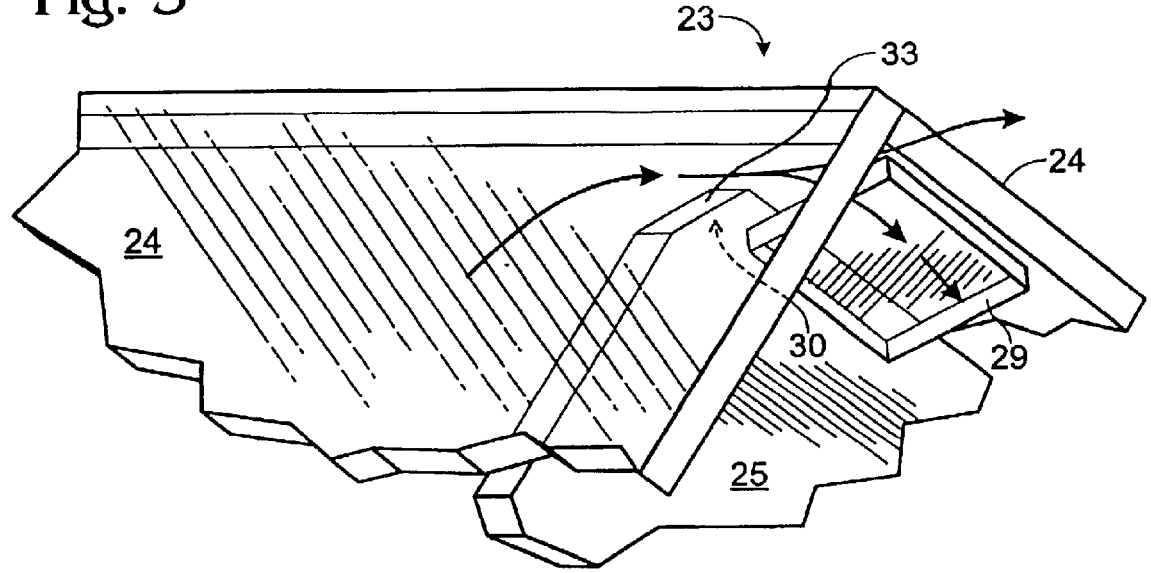
FIG. 5 is a pictorial view of a vent according to the present invention.

The invention advantageously provides for exhausting the apparatus 10. Referring to FIG. 5, a vent 30 is preferably provided at the top of the structure 23, e.g., by removing the apex of one or both of the triangular panes 25 and adding an additional glass shield 29 abutting one of the panes 24 and the triangular pane 25 to shield the vent and guide the airflow as shown by the arrows. Turning back to FIG. 3, in addition, no sealing is necessary along the junction 27 between the panes 24 and the gutters 28, and the bottom corners of the structure 23 are left unsealed as well. Leaving these junctions substantially or fully unsealed has been found to be effective at permitting outside air to enter through the junction, into the heat absorbing volume 12, displacing air inside the volume out the vent 30. However, other venting means may also be provided once it is recognized that adequate ventilation materially enhances the operating life of the apparatus by drying the gutters during periods when evaporation in the apparatus is not occurring to any substantial degree, such as at night time. This discourages the formation of algae and bacteria in the gutters as well as throughout the interior of the apparatus 10. Moreover, the addition of a silicone filling 28$b$ in inner channels 28$a$ throughout the perimeter of the tray has been found to further inhibit algae and bacteria migration from the tray 13 to the gutters 28 without affecting the thermal insulation provided by the channels. Therefore, this gutter/channel/tray configuration is much preferred.

Bacterial growth is preferably further inhibited by the use of titanium-laden magnetite mixed with the anthracite particles in the tray of the solar unit. Titanium is known for its antibacterial activity and magnetite has been found to be a useful heat-absorbing material. Therefore, combining such material with coal has been found to decrease the solar unit's susceptibility to bacterial contamination. Magnetite has proven to be less effective than anthracite for heating purposes; nevertheless, the invention could be practiced using titanium-laden magnetite alone as the heat-absorbing medium.

Where all or parts of the junction between the structure 23 and the gutters 28 are left unsealed, dust shields or skirts 32 are advantageously placed on the exterior of the structure, over this junction, in order to help deflect externally applied water and dust from the structure. An outer channel 28$c$ provides a gap to further isolate the pane/gutter junction 27 from exterior contamination. As best seen in FIG. 3, two opposite sides 41 of the dust shield 32 that face outwardly, away from the tray 13, form an included angle θ that is less than 180 degrees. One side 41 is attached to the glass pane 24, while the other side overlaps the outer channel 28$c$ to prevent water, dust, or other debris from collecting in the channel and contaminating the solar distillation unit. A dust shield 33 (FIG. 5) is preferably also provided over the vent 30, this dust shield being formed of glass, due to its location, so as not to block incoming solar radiation.

According to a further advancement in the art, the skirts 32 around the perimeter of the gutters 28 are made of heat conductive material, such as metal. By virtue of the contact between the skirts 32 and the glass panes 24 in the vicinity of the gutters 28, the skirts act as a heat sink and extract heat from the bottom portion of the panes 24 and radiate it to the atmosphere outside the unit. This prevents the temperature of the bottoms of the panes 24 from being raised excessively as a result of their proximity to the black-body absorber 18 and from causing the re-evaporation of condensed water running down the interior surface of the glass panes. This effect is especially advantageous during the day, when the water in the tray 13 and the interior surfaces of the glass panes 24 are very warm and tend to cause the re-evaporation of condensed water that collects in the gutters 28.

Figure 6:
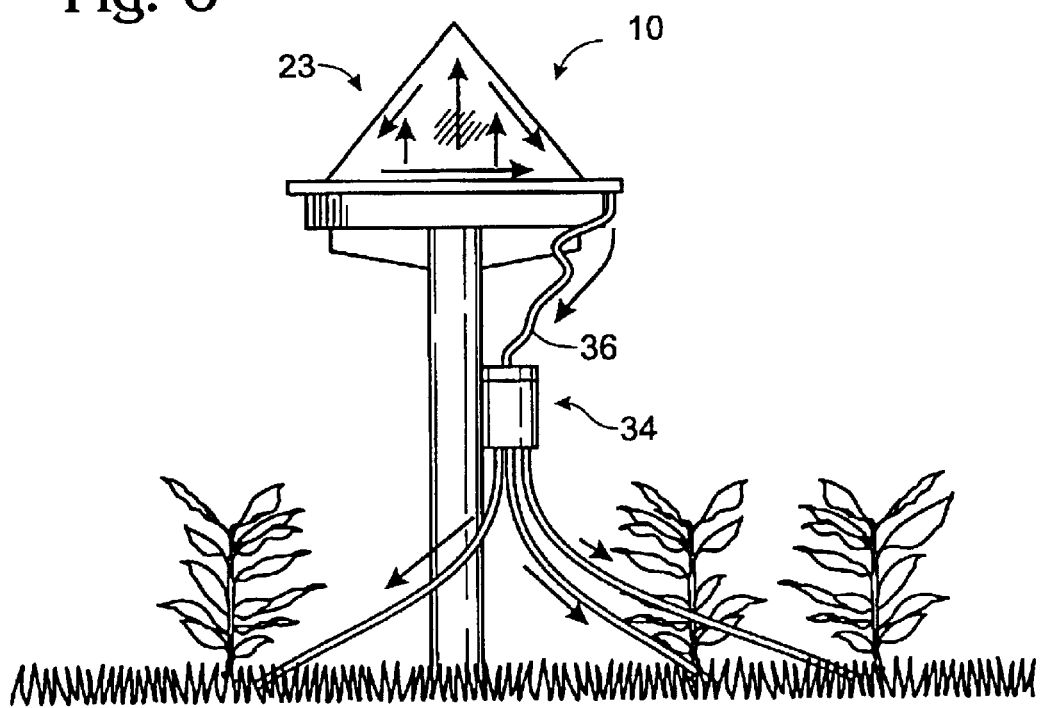
FIG. 6 is a pictorial view of the apparatus of FIG. 1 shown installed in a yard for irrigation, and showing a receptacle according to the present invention for storing the water distilled in the apparatus.

Turning to FIG. 6, the water collected by the gutters is preferably captured and stored for use in a glass receptacle 34 that has been tinted, e.g., bronzed, to reduce the amount of visible light that may enter the receptacle, yet provide sufficient transparency to view the water level. Protecting the water in the container from visible light discourages the growth of microorganisms and algae and is believed to be important even where the container is maintained indoors. The water is preferably carried from the apparatus 10 to the container 34 in a polyethylene tube 36. The receptacle 34 preferably includes a dust shielded vent (not shown) serving the same purpose as the vent 30 described above.

Figure 7:
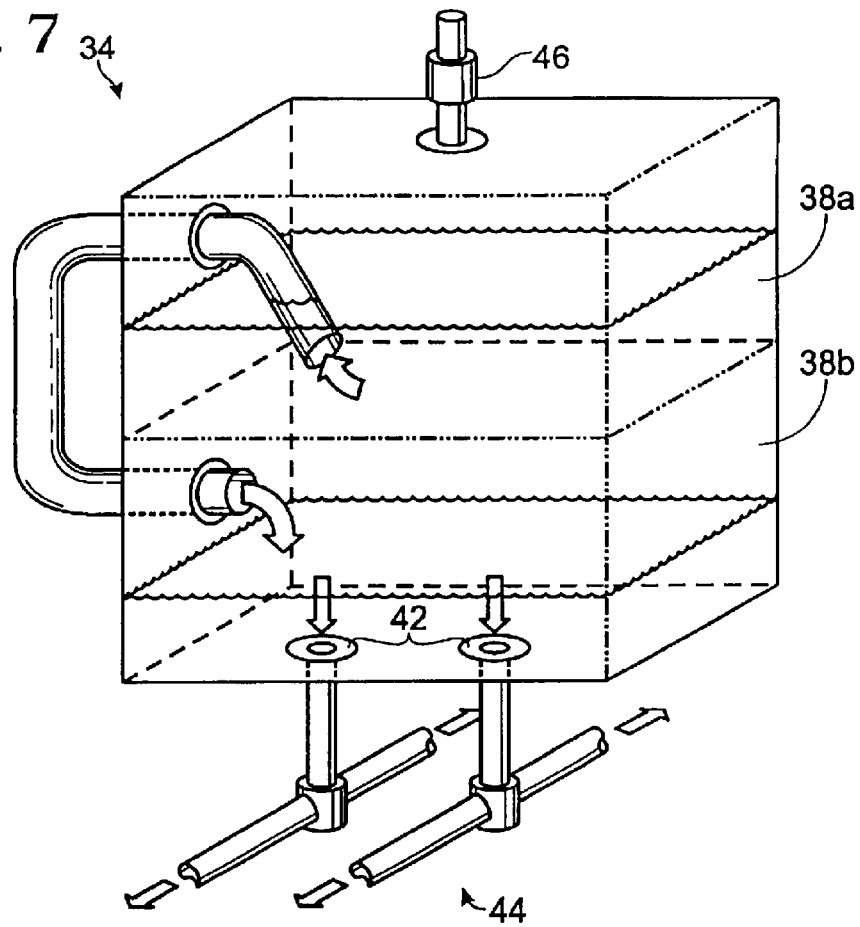
FIG. 7 is a more detailed pictorial view of the receptacle of FIG. 6.

FIG. 6 shows use of the apparatus 10 for irrigation. Turning to FIG. 7, the receptacle 34 is preferably formed into upper and lower chambers 38$a$ and 38$b$ for this purpose. The upper chamber 38$a$ receives the water from the apparatus 10 and fills the chamber. A pump 40 is controlled to pump the water from the upper chamber 38$a$ to the lower chamber 38$b$ on a schedule, preferably every 2 hours. Outlets 42 in the lower chamber provide for drip irrigation which is distributed to plants through a distribution system 44.

For irrigation purposes, the receptacle 34 is advantageously placed outdoors with the apparatus 10, such as shown in FIG. 6. It has been found that plants in the Southwest portion of the United States, i.e., in a relatively arid environment, grow substantially faster with water provided directly from the apparatus 10 as shown than they do with water provided from other sources, such as tap water. For drinking use, the receptacle 34 is preferably kept indoors.

The method of the invention preferably provides additional filtration steps. Turning back to FIG. 1, the water that is provided to the apparatus is preferably passed through a filter 38 that is upstream of the float valve 16, and through another filter 40 that is downstream of and proximate to the float valve. Referring to FIG. 7, the glass receptacle 34 preferably includes yet another filter 46 similar to the filter 38 in line with the glass receptacle 34. All of these filters preferably employ charcoal as the filtering medium, and the filter 40 may be constructed in the form of a stainless steel can with holes at the bottom. It may not be appreciated that the function of the charcoal is primarily to remove gases and bulk contaminants from the fluid, not the minerals that can make the water taste bad. Hence, the filtration steps are provided to enhance the distillation process and will not substitute for it.

There are many people, including some physicians, who believe that water becomes "clustered" or "structured" as a result of exposure to various forms of energy, including light energy, and that ingesting water having this property can have a beneficial effect on health. For example, as reported by Norman deLauder Mikesell in a 1985 article currently being published on the Internet and entitled "Structured Water: Its Healing Effects on the Diseased State," healthful and therapeutic effects of structured water include stopping the growth of pathogenic bacteria and cancer tumors, and enhancing organ functions and endocrine excretions.

In view of this, the present inventor has recognized that structured water should be produced in a solar distiller due to exposure to solar radiation. Pursuing this idea, the inventor has tested water from the solar distiller apparatus 10 for its spectral absorption characteristics and determined that these characteristics are different for water from the apparatus 10 than for ordinary tap water, but that this difference was found to diminish to zero over a time of about one week. It is believed that the difference in spectral absorption characteristics is due to structuring of the water, so that solar distilled water may be used to produce and maintain optimum health where a substantial amount of the water is ingested per day, ensuring that the water ingested is not more than 7 days old measured from the time when it was evaporated in the distiller. A "substantial amount" of solar distilled water for a person means at least about 80% of the total water ingested by the person, excluding water that is derived from beverages or food. "Daily" means at least 90% of the days in any given month. The inventor has also recognized that the benefits of structured water can be exploited by covering aqueducts with glass panels and continuously capturing the distillant.

Figure 8:
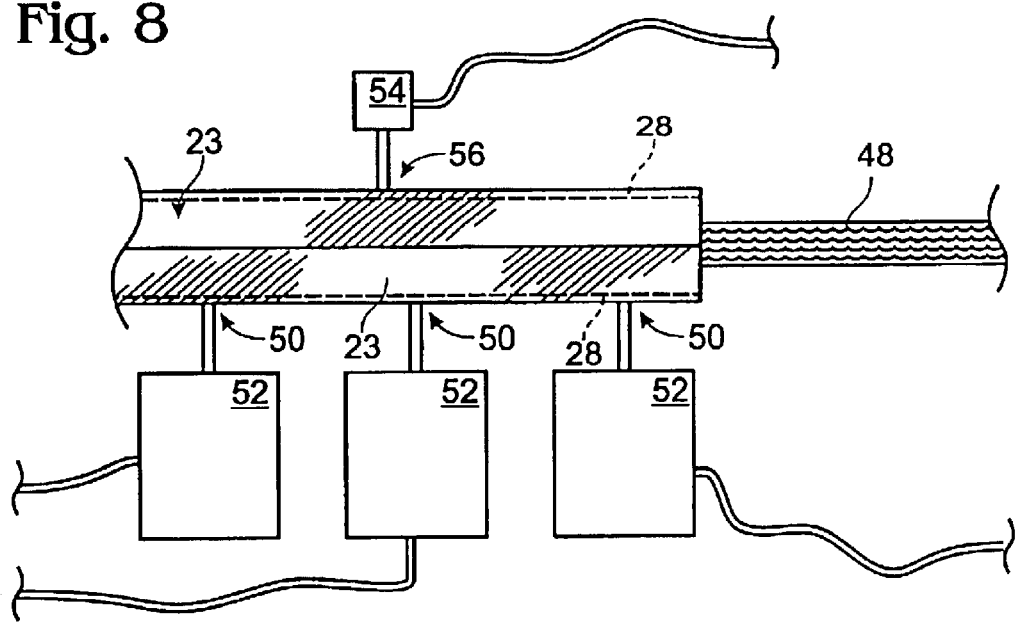
FIG. 8 is a plan view of the apparatus of FIG. 1 modified for use over an aqueduct according to the present invention.

Referring to FIG. 8, more particularly, it is one aspect of the invention to provide a large scale version of the structure 23 and gutters 28 to place over an otherwise open aqueduct 48. A black-body absorber could also be provided in the bed of the aqueduct; however, this is not necessary to obtain many of the advantages described herein. The water collected from the gutters 28 may be removed at selected locations 50 along the aqueduct and stored in containers or pools 52 for distribution, or the water may be pumped (e.g., at 54) from selected locations 56 to remote locations for storage or use.

As mentioned above, the materials used in the apparatus to which the evaporating and evaporated water is exposed should be limited according to the invention. The light transmissive material used in the apparatus is glass. Metal parts of the apparatus interior thereto are non-corroding, and should be at least as noble, as defined by the galvanic series, as stainless steel. Where a sealant or adhesive is required, it should be silicone, preferably aquarium grade or pure silicone. It is preferable that no less than about 98% of the surface area inside the heat absorbing volume 12 should be of these materials in order that the apparatus may provide water that is perceptibly free of solid and gaseous contamination for a maximum length of time.

It is to be recognized that, while a particular method and apparatus for distilling water using solar energy has been shown and described as preferred, other configurations could be utilized, in addition to configurations already mentioned, without departing from the principles of the invention. For example, the source of water could be rain collected in a cistern and further purified and treated in the solar distillation unit of the invention before use. Thus, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A solar distillation unit comprising:

a tray with an insulated outer surface;

a layer of coal particles lining an inner surface of the tray;

means for admitting water into the tray as needed to maintain a predetermined water level in the tray;

an outer gutter adjacent to a perimeter of the tray and sloped toward a water outlet;

an inner channel forming an insulating gap between the tray and the gutter;

a greenhouse covering with a bottom portion resting in said gutter;

an outer metallic skirt attached to said bottom portion of the greenhouse covering and extending outwardly therefrom;

means for venting said greenhouse covering;

a charcoal filter coupled to said means for admitting water into the tray;

a distilled water container connected to said water outlet;

an outer channel providing an isolating gap between the gutter and an exterior environment; and a silicone filling in said inner channel;

wherein said skirt extends over said outer channel, said coal particles are anthracite less than about 3 mm in nominal diameter, said greenhouse covering is formed essentially of glass, and said tray and skirt are made of stainless steel.

2. The apparatus of claim 1, wherein said greenhouse covering includes two flat panes of glass that form an included angle therebetween of at most about 120 degrees.

3. The apparatus of claim 1, wherein at least 98% of an interior surface of the solar distillation unit consisting of glass, silicone, coal and stainless steel.

4. The apparatus of claim 1, further comprising titanium-laden magnetite mixed with said coal particles.

5. A solar distillation unit comprising:

a tray with an insulated outer surface;

a layer of coal particles lining an inner surface of the tray;

means for admitting water into the tray as needed to maintain a predetermined water level in the tray;

an outer gutter adjacent to a perimeter of the tray and sloped toward a water outlet;

an inner channel forming an insulating gap between the tray and the gutter;

a greenhouse covering with a bottom portion resting in said gutter;

an outer metallic skirt attached to said bottom portion of the greenhouse covering and extending outwardly therefrom; and titanium-laden magnetite mixed with said coal particles;

wherein said greenhouse covering includes two flat panes of glass that form an included angle therebetween of at most about 120 degrees, and wherein at least 98% of an interior surface of the solar distillation unit is restricted to materials selected from the group consisting of glass, silicone, coal and stainless steel.

6. The apparatus of claim 5, wherein said coal particles are anthracite less than about 3 mm in nominal diameter.

7. The apparatus of claim 5, wherein said tray is made of stainless steel.

8. The apparatus of claim 5, wherein said skirt is made of stainless steel.

9. The apparatus of claim 5, further comprising a silicone filling in said inner channel.

10. The apparatus of 5, further comprising an outer channel providing an isolating gap between the gutter and an exterior environment.

11. The apparatus of claim 10, wherein said skirt extends over said outer channel.

12. The apparatus of claim 5, further comprising a charcoal filter coupled to said means for admitting water into the tray.

13. The apparatus of claim 5, further comprising a distilled water container connected to said water outlet.

14. The apparatus of claim 5, further comprising means for venting said greenhouse covering.

* * * * *

UNITED STATES PATENT AND TRADEMARK OFFICE
CERTIFICATE OF CORRECTION

PATENT NO. : 6,797,124 B2
DATED : September 28, 2004
INVENTOR(S) : David M. Ludwig It is certified that error appears in the above-identified patent and that said Letters Patent is hereby corrected as shown below:

Column 8,
Line 53, change "cuter" to -- outer --
Line 62, after "unit" insert -- is restricted to materials selected from the group --

Signed and Sealed this

Thirty-first Day of May, 2005

JON W. DUDAS
*Director of the United States Patent and Trademark Office*